United States Patent [19]
Hoffmann et al.

[11] Patent Number: 5,999,399
[45] Date of Patent: Dec. 7, 1999

[54] ELECTRIC CONDENSER, ARRAY OF SUCH CONDENSERS, AND METHOD OF PRODUCING SUCH CONDENSERS AND CONDENSER ARRAYS

[76] Inventors: Hans Hoffmann, Endersbacher Strasse 51, Stuttgart, Germany, D-70374; Sven Siemonsen, Darmstätter Strasse 84, Stuttgart, Germany, D-70376

[21] Appl. No.: 08/983,521
[22] PCT Filed: Jul. 26, 1996
[86] PCT No.: PCT/EP96/03305
   § 371 Date: May 15, 1998
   § 102(e) Date: May 15, 1998
[87] PCT Pub. No.: WO97/05633
   PCT Pub. Date: Feb. 13, 1997

[30] Foreign Application Priority Data

Aug. 1, 1995 [DE] Germany .......................... 195 28 169

[51] Int. Cl.[6] .................................................. H01G 4/005
[52] U.S. Cl. ....................... 361/303; 361/508; 361/528; 361/532
[58] Field of Search ................................... 361/303, 334, 361/508, 516, 515, 528, 532, 434; 29/25.42, 25.41

[56] References Cited

U.S. PATENT DOCUMENTS 3,626,258  12/1971  Makow .

FOREIGN PATENT DOCUMENTS

| 0 272 926 A2 | 6/1988 | European Pat. Off. . |
| 629 761 | 5/1936 | Germany . |
| 1 128 923 | 5/1962 | Germany . |
| 3005725A1 | 8/1981 | Germany . |
| 894951 | 4/1962 | United Kingdom . |
| WO 96/26552 | 8/1996 | WIPO . |

*Primary Examiner*—Dean A. Reichard
*Assistant Examiner*—Anthony Dinkins
*Attorney, Agent, or Firm*—Jones, Tullar & Cooper, P.C.

[57] ABSTRACT

The invention relates to an electric condenser with a negative pole and a positive pole held a given distance apart with a dielectric between the poles. The two poles each have the same three-dimensional lattice-like structure and are held the same distance apart, inserted into one another in every direction. A condenser of this kind meets today's requirements for a high charge capacity but comparatively low volume and weight.

24 Claims, 12 Drawing Sheets

ELECTRIC CONDENSER, ARRAY OF SUCH CONDENSERS, AND METHOD OF PRODUCING SUCH CONDENSERS AND CONDENSER ARRAYS

BACKGROUND OF THE INVENTION

The present invention relates to an electric condenser or capacitor, further to a condenser array composed of two or more such condensers in accordance with the, and to a method for producing an electric condenser.

Electrical condenser or capacitors are known in a multitude of embodiments, for example as plate condensers, cylinder condensers, encased condensers and the like. It is common to all condensers that plate-shaped or flat, layer-like poles are placed opposite each other, wherein a dielectric, for example air, paper, ceramic material or the like is arranged between the poles. In order to increase the capacitance of the condenser, it is possible to achieve an increase in the plate surface by means of flat nesting of condenser plates. In spite of this the result is a limited capacitance per unit of structural volume. It is furthermore not possible to make the known condensers arbitrarily small.

SUMMARY OF THE INVENTION

It is the object of the present invention to provide an electrical condenser and a condenser array which is composed of two or more such condensers, which can meet the demands for high charge capacities with a comparably low structural volume and weight and can be constructed smaller than before. Furthermore, a method for producing such an electrical condenser, or respectively condenser array is to be provided, which is neither more labor-intensive nor cost-intensive.

This object is attained in connection with an electrical condenser of the species mentioned, or respectively a condenser array of the species mentioned, or respectively its or their production in that two pole arrangements, each having a three-dimensional grid-like structure and arranged nested inside each other in all spatial directions is provided, in that at least one grid-like structure is cut through in one plane, and in that continuous recesses are cut in a blank which are offset with respect to each other, in at least two planes, which extend vertically with respect to each other, and in at least two planes, which are offset by 45°, achieving a three-dimensional, grid-like total structure, separated into at least two individual structures constituting the pole arrangements.

By means of the measures in accordance with the present invention, a design of the pole arrangements as a three-dimensional body has been achieved, which has a large surface in relation to its own structural volume. The two pole arrangements are spatially nested so that the distances between the pole arrangements can become very small which, the same as the increased surface of the pole arrangements, considerably adds to a high capacitance.

With recesses produced by laser, the production of such condensers can be accomplished down to the size range of chip production, so that ICs with integrated condensers made of the same material and having large capacitances can be produced. The production of condensers whose recesses are cylindrical is particularly advantageous because of the surfaces of the circular recesses of essentially the same shape.

Further advantages of the measures of the present invention lie in that the loss angle of the condenser is improved and a reduced and linear temperature dependency has been achieved. Furthermore, almost any arbitrary structural shape can be achieved in a variable manner. Elaborate contacting at the pole arrangements for the voltage supply is not necessary; in addition, the contact positions are variable.

BRIEF DESCRIPTION OF THE DRAWINGS

Further details of the present invention can be taken from the following description, wherein the invention is described in more detail and explained by means of the exemplary embodiments represented in the drawings. Shown are.

DESCRIPTION OF THE PREFERRED EMBODIMENTS

The condenser, or respectively condenser array 10, or respectively 110, or respectively 210, or respectively 310, represented in the drawings in accordance with four exemplary embodiments, in the form of a respectively identical three-dimensional body for each pole of the pole arrangements 11, 12, or respectively 111, 112, or respectively 211, 212, or respectively 311, 312, represents a single condenser or a condenser circuit constituted by two or more condensers. In this case the pole arrangements 11 and 12, or respectively 111 and 112, or respectively 211 and 212, or respectively 311 and 312, which have a spatially three-dimensional grid-like structure, are nested in such a way that they respectively have essentially the same, or respectively a uniform distance from each other in each area. Since in the exemplary embodiments represented the two pole arrangements 11 and 12, or respectively 111 and 112, or respectively 211 and 212, or respectively 311 and 312 have the identical design, it is sufficient per se to describe their structural design by means of respectively one pole arrangement 11 and 12, or respectively 111 and 112, or respectively 211 and 212, or respectively 311 and 312.

Figure 1:
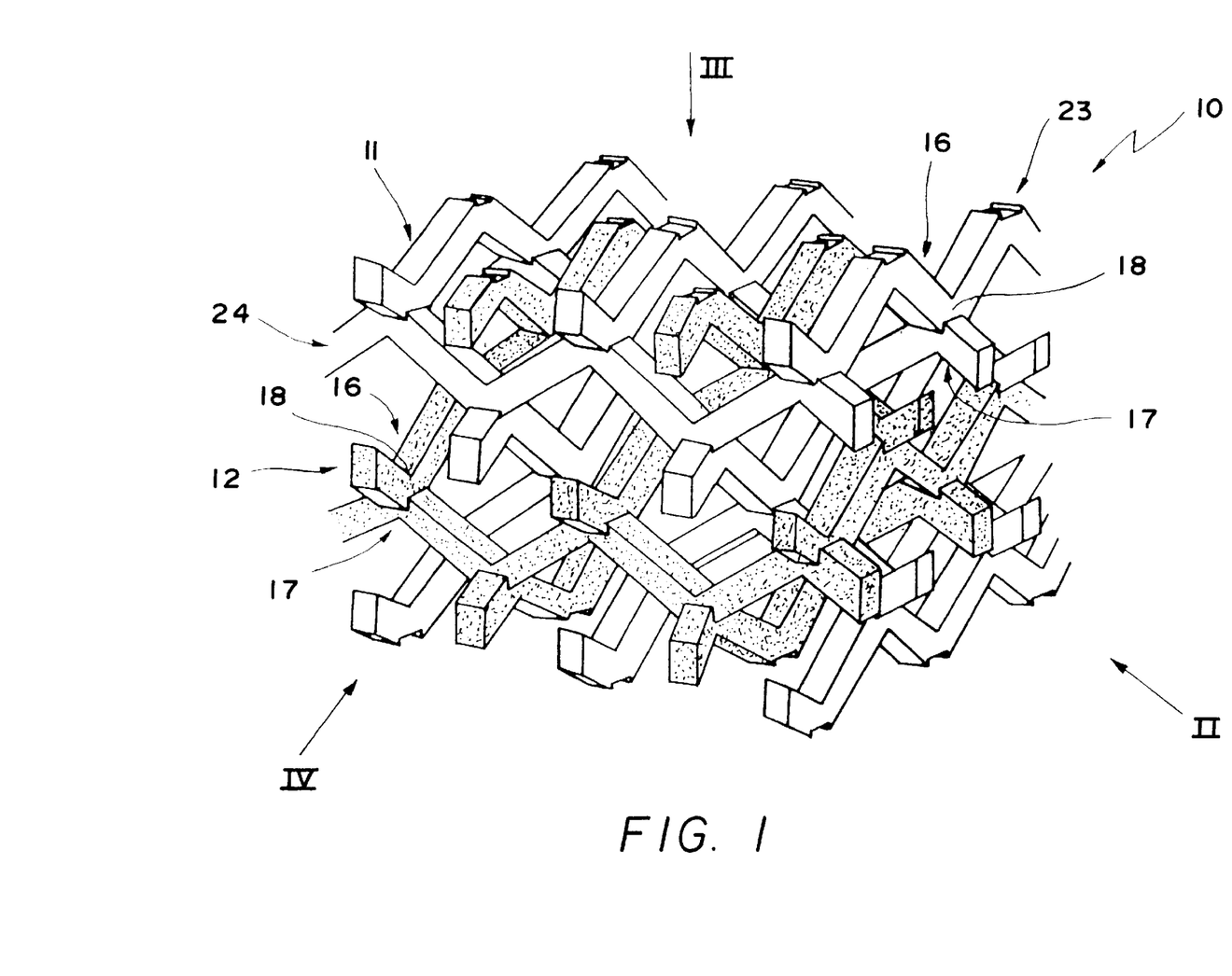
FIG. 1, which is a condenser in accordance with a first exemplary embodiment of the present invention in a partially broken perspective representation.
Figures 1A, 2:
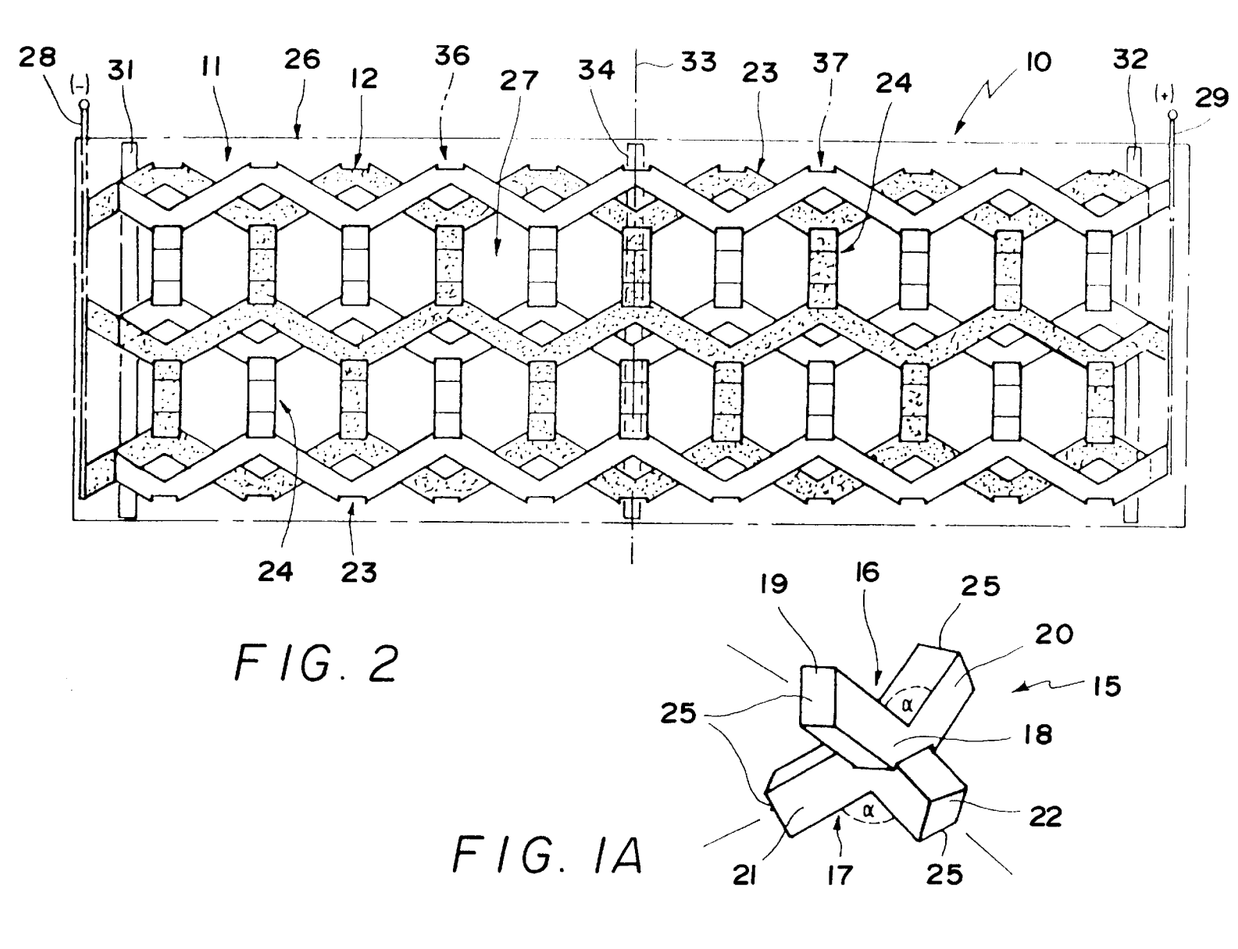
FIG. 1A, which is a grid element of one of the pole arrangements in FIG. 1 in an enlarged perspective representation.
FIG. 2, which is a lateral view in the direction of the arrow II in FIG. 1, but completed by dash-dotted lines and schematically to show a condenser.
Figure 1B:
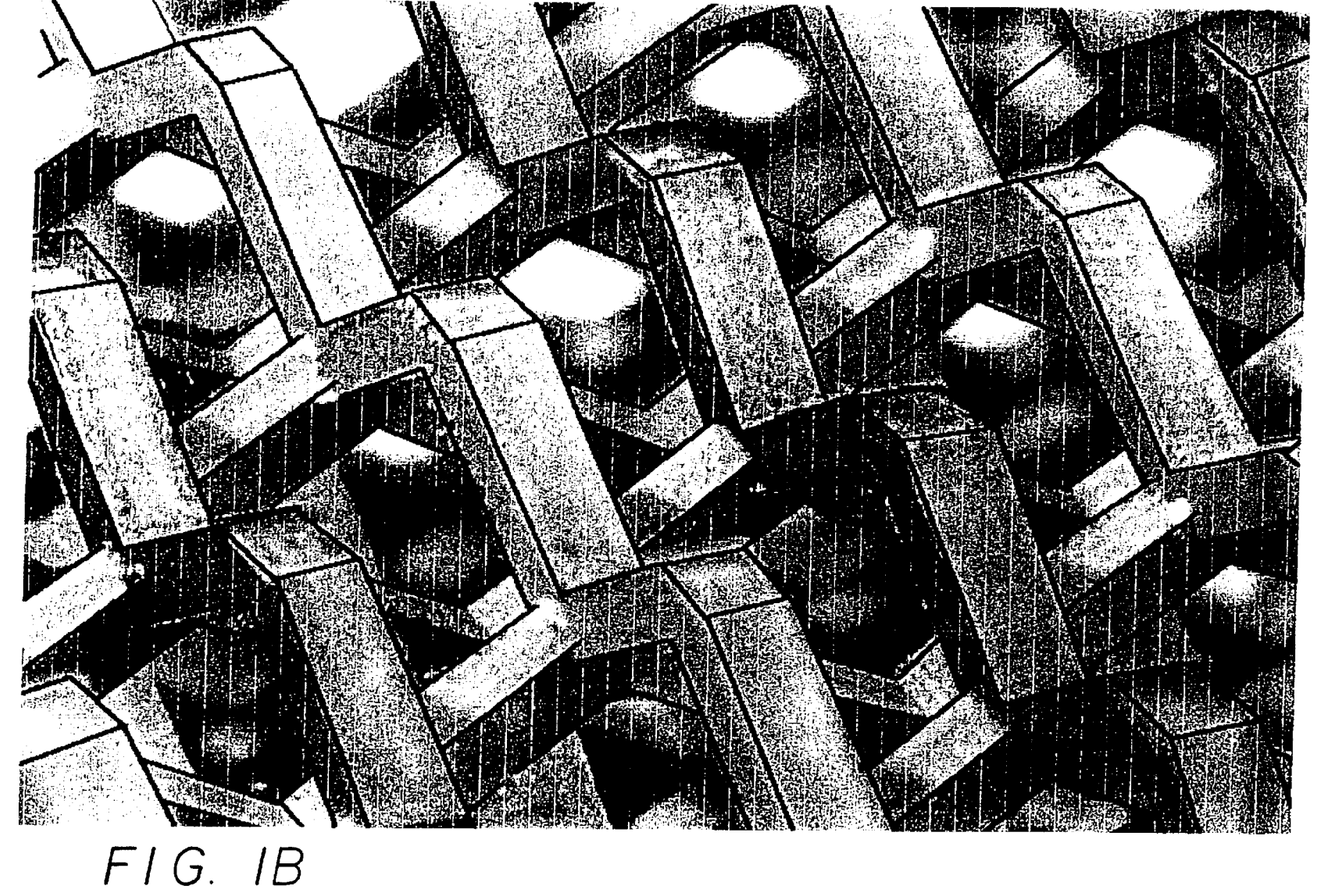
FIG. 1B, which is a representation corresponding to FIG. 1, enlarged in parts.
Figure 3:
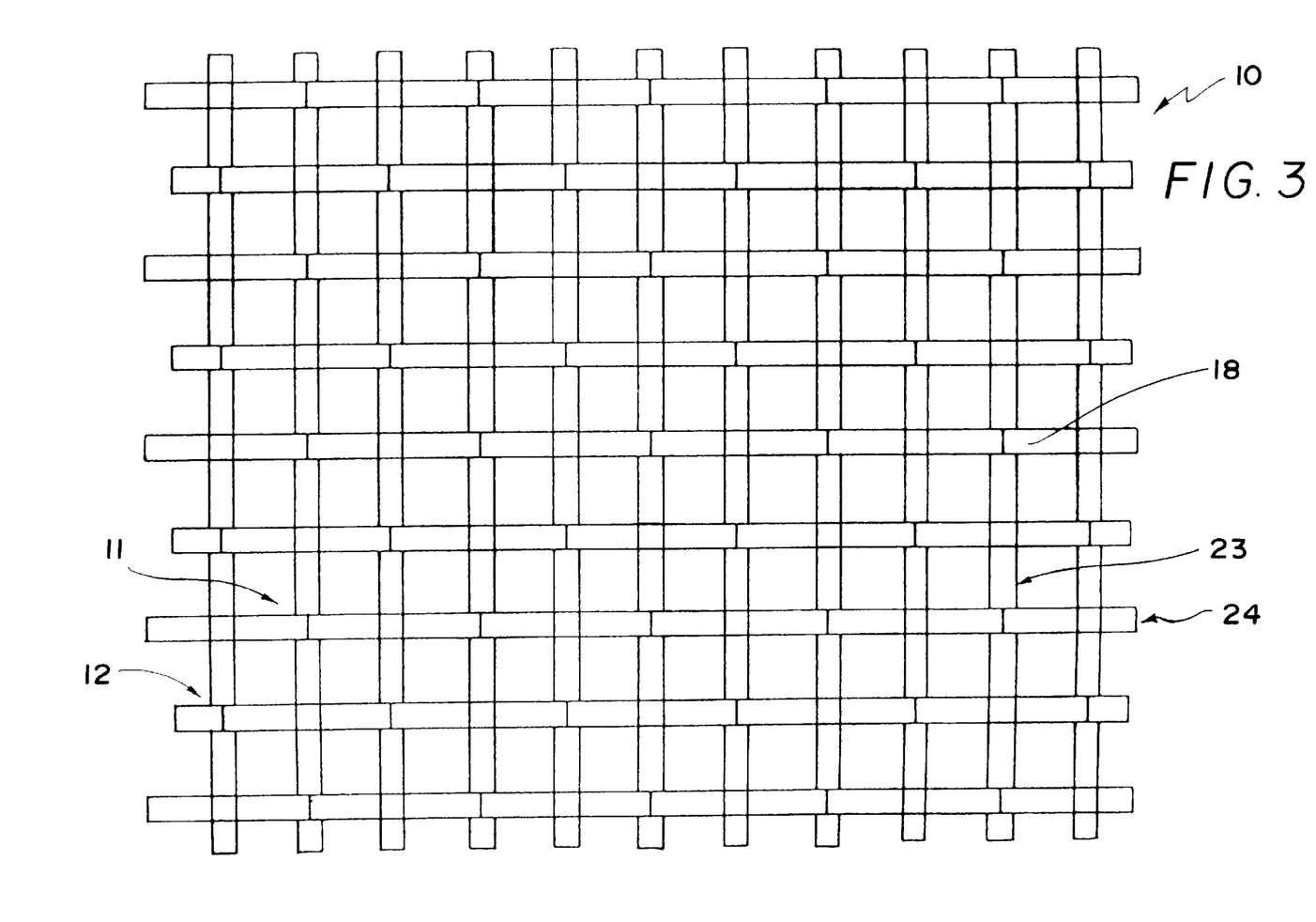
FIG. 3, which is a top view in the direction of the arrow III in FIG. 1.
Figure 4:
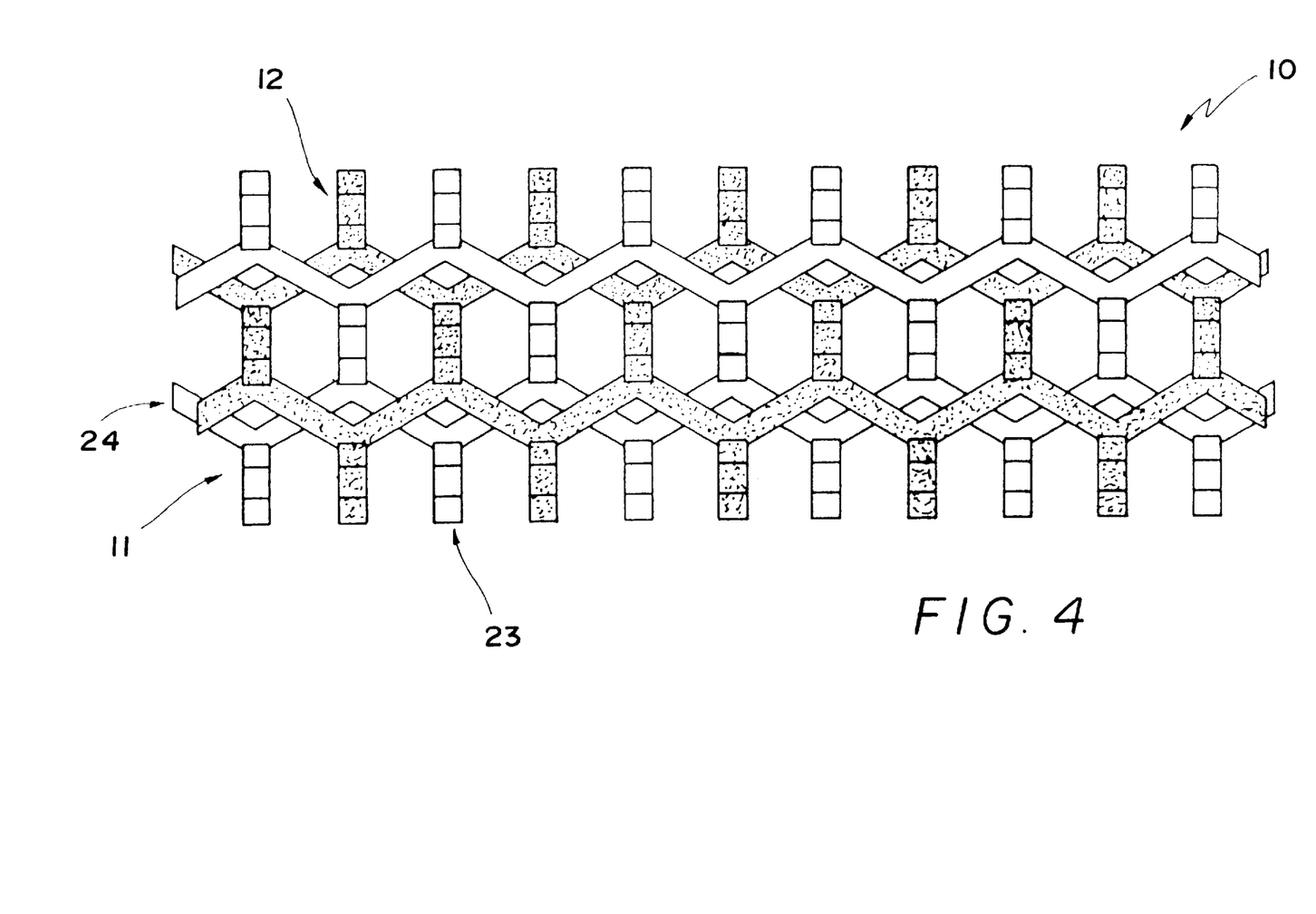
FIG. 4, which is a lateral view, offset by 90° in relation to FIG. 2, in the direction of the arrow IV in FIG. 1.

In the exemplary embodiment of a condenser 10 represented in FIGS. 1 to 4, which is merely used for the description of the basic, three-dimensional structure, the pole arrangement 11 (and corresponding to what was said above, also the pole arrangement 12) is built up of a plurality of grid elements 15, wherein in accordance with FIG. 1A each grid element 15 is constituted by two, approximately V-shaped element section pairs 16 and 17, which are located in planes perpendicular with respect to each other and are connected with each other meeting to form a junction 18. Each V-shaped element section pair 16, 17 has two strip-shaped element sections 19 and 20, or respectively 21 and 22, which are located in the same plane and are identically designed and which, starting at the junction 18, respectively diverge at a defined angle $\alpha$. The grid element 15 can be considered to be a symmetrical, ray-shaped structure, whose junction 18 forms the center of a cube, and whose strip-like element sections 19 to 22 extend to respectively diagonal corners of several cube faces. Because of this, starting at the junction 18, the strip-like element sections 19 to 22 of the element section pairs 16 and 17 respectively form the same angle between each other and are of the same length. In the exemplary embodiment represented, the cross section of the strip-shaped element sections 19 and 20, or respectively 21 and 22 is square; however, any other arbitrary cross section, for example a round or hexagonal cross section, can be selected. The ends 25 of the strip-like element sections 19 to 22 are respectively connected with the ends of adjoining strip-shaped element sections of further grid elements 15, or respectively are of one piece with them, so that the (spatial) three-dimensional grid-like structure is the result of a plurality of grid elements 15 arranged underneath, on top and next to each other. It is understood that the selection of the number of grid-elements 15 in the three space directions is a function of the desired exterior dimensions of the condenser 10. As mentioned above, the pole arrangement 12 is constructed in the same identical way.

In this exemplary embodiment, the nesting of the pole arrangements 11 and 12 in all spatial directions to form the condenser 10 takes place either in such a way, that initially the individual grid elements 15 of the pole arrangements 11 and 12 are respectively nested three-dimensionally and are then connected with the respectively also three-dimensionally nested adjoining grid elements 15. The construction of the condenser 10 can also take place in such a way, that first the grid structure of a pole arrangement 11 or 12 is constructed, and thereafter V-shaped element section pairs 16 and 17, connected in a row, are separately produced and these are three-dimensionally threaded into the grid structure of the one pole arrangement 11 or 12 as longitudinal and transverse rows 23 and 24 for forming the respectively other pole arrangement 12 or 11, and are finally connected with each other. In order to keep the grid poles 11 and 12 at the selected distance in case of a non-solid dielectric, end disks 31, 32, for example, made of an electrically insulating plastic have been cast near the ends of the condenser 10 and tightly enclose the strips 21 to 22, as shown by way of example only in FIG. 2.

To produce a condenser 10, the pole arrangement can be surrounded by a housing 26 and the interior 27 can be filled by gaseous, liquid or solid dielectric, as indicated by way of example by dash-dotted lines in FIG. 2. If the condenser 10 is only constituted by one cell, which for example is provided with two end disks 31 and 32, the two grid-like (positive and negative) poles 11 and 12 are respectively provided with an electrical connection 28, or respectively 29.

If a condenser array is to be constructed from two or more cells, or respectively condensers, this can be done in a simple manner in that at least one of the grid-structure poles 11 or 12 is divided into one, two or several planes, such as represented by dash-dotted lines by means of the separation plane 33 in FIG. 2, and the ends are placed apart from each other. For electrical insulation, a partition, indicated by dashes lines, made of an electrically insulating material, for example plastic, is placed into this separation plane 33, which tightly encloses the strip-like element sections 19 to 22 of the other pole arrangement 12 and in this way results in a close separation between the, for example, two cells for the dielectric. Because of this, each condenser cell has two individual poles 36 and 37, which have been formed from the entire pole arrangement 11, as well as the pole arrangement 12, which is still embodied as an entire pole. It is understood that an electrical parallel or series connection of the two condenser cells can be made by means of appropriate electrical connections.

In place of the "vertical" separation represented by a dash-dotted line in FIG. 2, a "horizontal" separation of the condenser into two or more cells can be made. If the pole arrangements 11 and 12 are further extended or built up in the manner according to FIG. 2, so that, for example, an arrangement of transverse rows 24 is lacking above the upper longitudinal rows 23 of the pole arrangement 12, and if a separation wall, here horizontal, is placed in this plane, which is integrated in all directions into a pole arrangement 11 constructed without a missing row, two adjoining cells, which are separated from each other are the result, to which the pole arrangement 11 is common and wherein two individual poles have been created from the pole arrangement 12.

It is understood that the respectively other pole arrangement can also be opened up or that even both can be opened up in a corresponding manner. With several individual cells of a condenser it is practical to open up both pole arrangements 11 and 12 in such a way that the separation planes of the individual pole arrangements are respectively arranged to be offset from each other, so that respectively one of the individual poles is assigned to two adjoining cells.

The selection of the materials for the grid elements 15, or respectively the pole arrangements 11 and 12 and the dielectric 27 can be made in a known manner.

Figure 5:
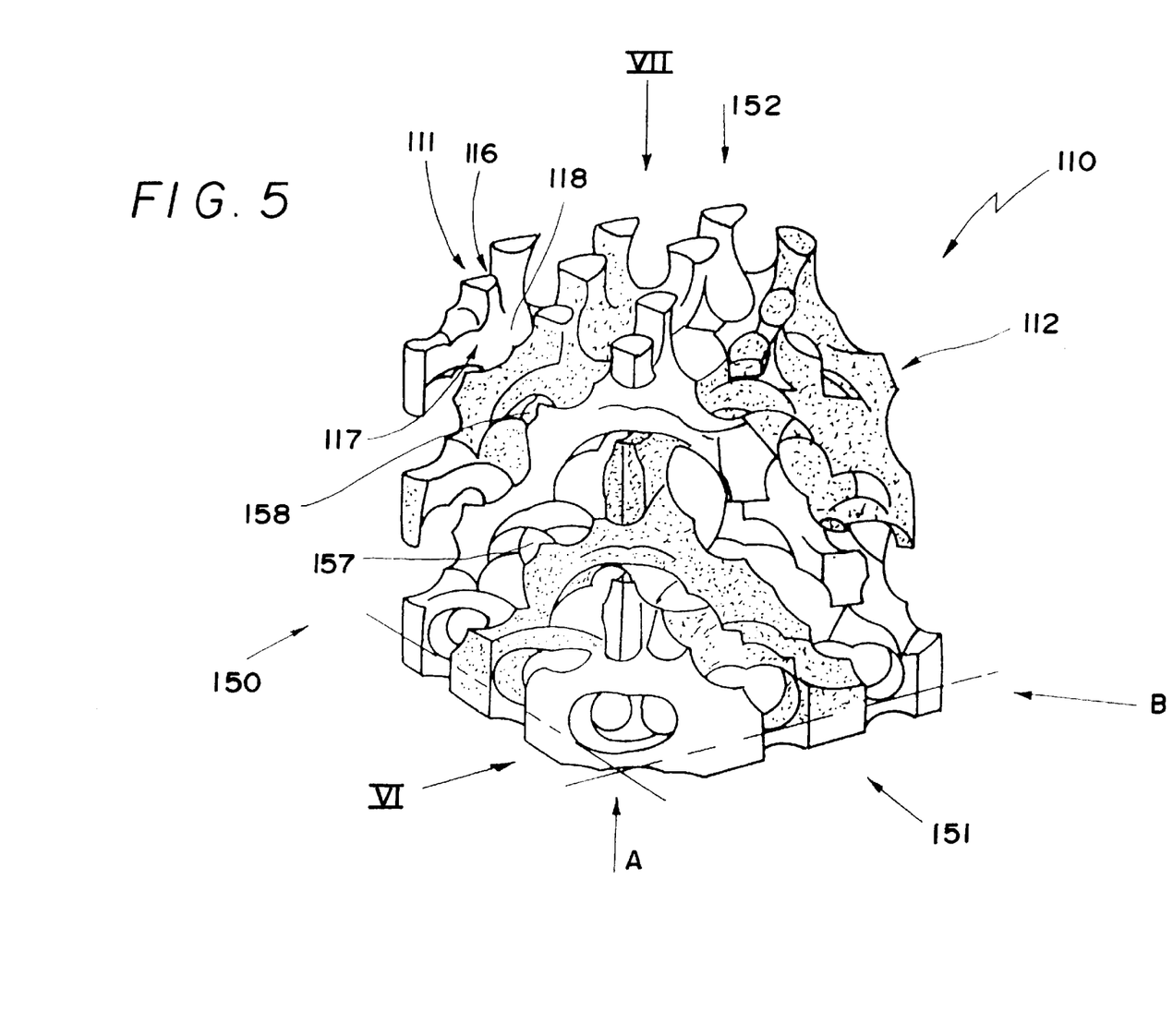
FIG. 5, which is a condenser in accordance with a second exemplary embodiment of the present invention in a partially broken perspective view in a not yet completely severed state of the two pole arrangements.
Figure 6:
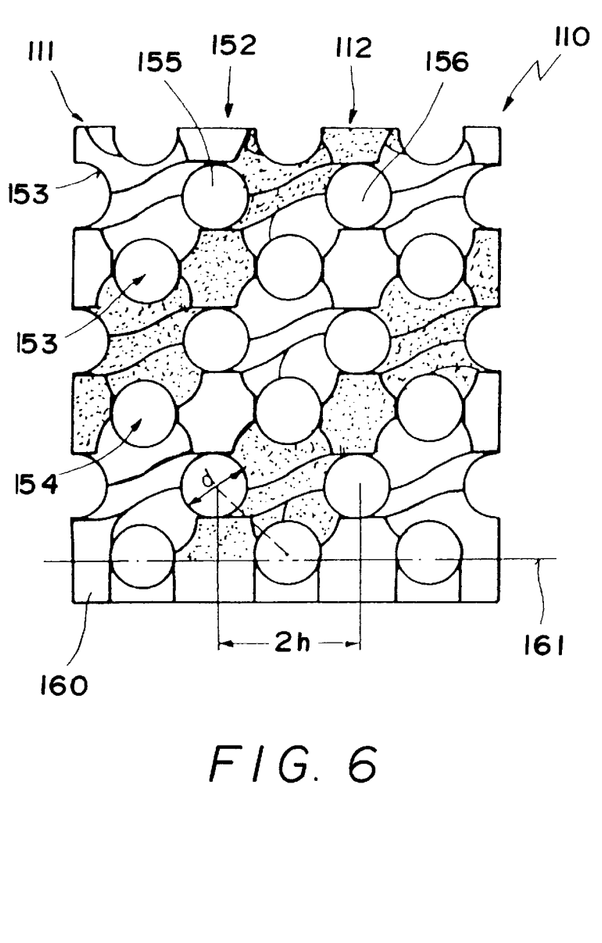
FIG. 6, which is a lateral view in the direction of the arrow VI in FIG. 5.
Figure 7:
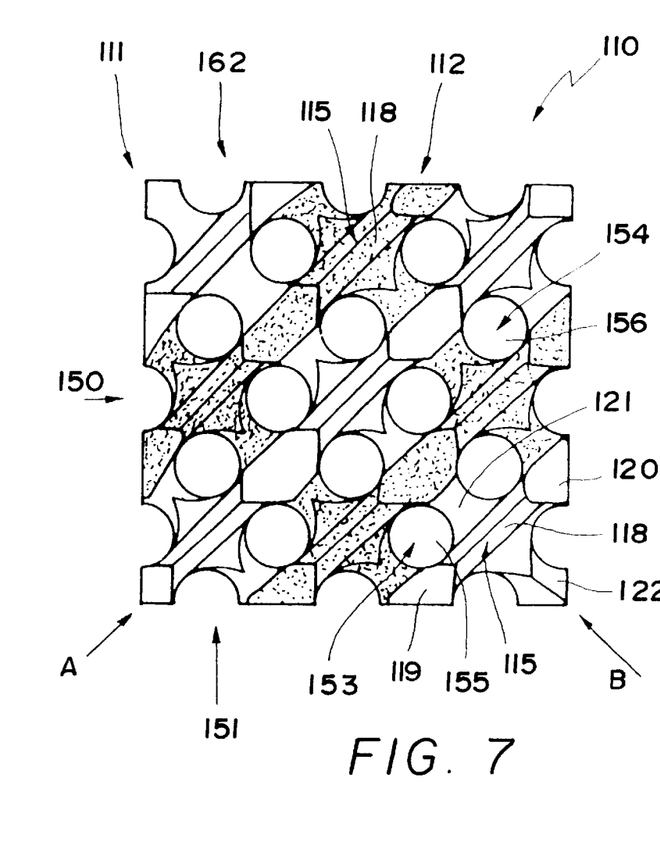
FIG. 7, which is a top view in the direction of the arrow VII in FIG. 5.

In the exemplary embodiment of the condenser 110 represented in FIGS. 5 to 7, the three-dimensional, grid-like structure of the pole arrangements 111 and 112 is also formed in a uniform design and by the respective line-up of individual grid elements 115 constructed from strip-like element sections 119 to 122, but their V-shaped element section pairs 116 and 117, beginning at the junctions 118, are not the same in cross section because of the special production process.

With this exemplary embodiment the electrode arrangement 110 is made, for example, from an elongated cube-shaped material, such as a rod material. However, depending on the final shape of the condenser to be achieved, the starting material, or respectively the blank, can have a spatial shape of any arbitrary type or size adapted to this desired final shape, i.e. also any arbitrary irregular shape. For a simplified explanation, the production of the condenser 110 will be described by means of a cube.

The cube is provided from the direction of three sides, which extend vertically with respect to each other, for example from the sides 150, 151 and 152, with respectively several rows 153 and 154 of continuous bores. In this case the adjoining bore rows 153 and 154 of each side 150 to 152 are provided with bores 155 and 156 in such a way, that the bores 155 and 156 of adjoining bore rows 153 and 154 are disposed offset with respect to each other. In other words, viewed in the diagonal direction of each cube side, the bores 155, 156 of respectively adjoining bore rows 153, 154 also lie in a row. Because of this the individual, respectively continuous bores 155 and 156 of all three sides 150 to 152 penetrate each other in a correspondingly offset manner. Furthermore, bores 157 and 158 are drilled in several parallel rows from two diagonal directions A and B, which extend vertically with respect to each other, i.e. at an angle of 45° with respect to the sides 150 and 151 on the one hand and, on the other hand, with respect to the side 150 and a side 162 located opposite the side 151, wherein the rows of the one diagonal direction A are also arranged offset with respect to the other diagonal direction B.

Under a defined condition it is sufficient to drill the basic body or blank from the direction of two planes, which are vertical with respect to each other, and from two diagonal directions, which extend vertically with respect to each other, for example the directions A and B, namely in a case where the bore diameter is sufficiently large so that the pole arrangements are separated from each other. A prerequisite in this case is that the bores respectively have the same diameter d. In other words, $d > h/\sqrt{2}$, wherein h is one half the distance between the centers of two bores 155, 156, which are adjoining over a junction 118 (FIG. 6). If, however, d is considerably less, it is necessary to drill from even more sides, or respectively diagonals.

The grid-like pole arrangements 111 and 112 result from this, which are separated from each other and held together at even distances by lateral wall disks, of which only the lateral wall, or respectively bottom disk 160 in this case, can still be seen in FIGS. 5 and 6. The other lateral wall disks have already been cut off in such a way that semi-cylindrical bore elements 163 remain on the sides of the condenser 110, which is still to be considered a blank.

As mentioned, the strips 119 to 122 of the grid elements 115 have a uniformly changing cross section. Evening out of the cross section can be achieved in that further bore rows are cut at 45° with respect to the top 152 from one or two directions which are vertical with respect to each other. In this way it is possible to work toward a uniformity of the distance between the pole arrangements 111 and 112 in all sectors.

If the bottom disk 160 were also to be cut off in the plane 161 represented by dash-dotted lines, the two grid structure poles 111 and 112 could move with respect to each other in the arrangement in which they are nested in each other. To prevent this, the bottom disk 160 is only cut off at a time when, for building a condenser, an electrically insulating end disk (corresponding to the end disks 31, 32 in FIG. 2) has been installed in at least one end, which maintains the two pole arrangements 111 and 112, which are nested in each other in all spatial directions, or respectively three-dimensionally, mechanically secure and at the preset distance.

With this exemplary embodiment it is also possible without difficulty to divide the condenser into two or more cells by electrically separating the grid structure poles 111 and/or 112 in a desired plane into individual poles by mechanical separation. In a corresponding manner it is possible to provide partitions by separating two or more cell spaces.

With this exemplary embodiment it is useful to provide a metal suitable for condensers as the basic material. However, it is also possible to make the grid structure of the poles 111 and 112 initially from another material, for example plastic, which is then coated with an appropriate electrically conducting material suitable for condensers.

Figure 8:
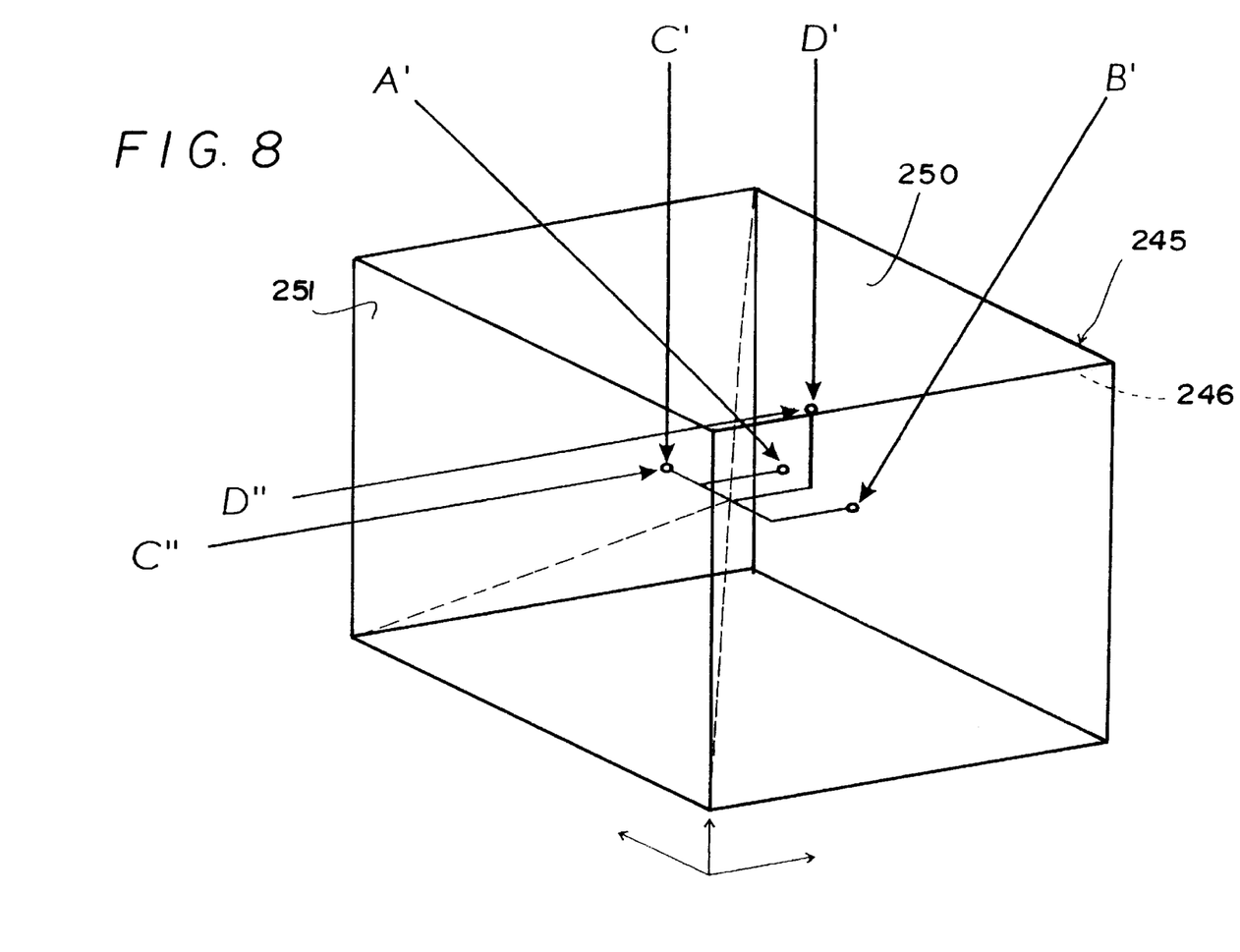
FIG. 8, which is a drilling diagram for the production of the pole arrangement for a condenser, represented on a cube-shaped blank as the initial workpiece, but in accordance with a third or respectively fourth exemplary embodiment of the present invention.
Figure 9:
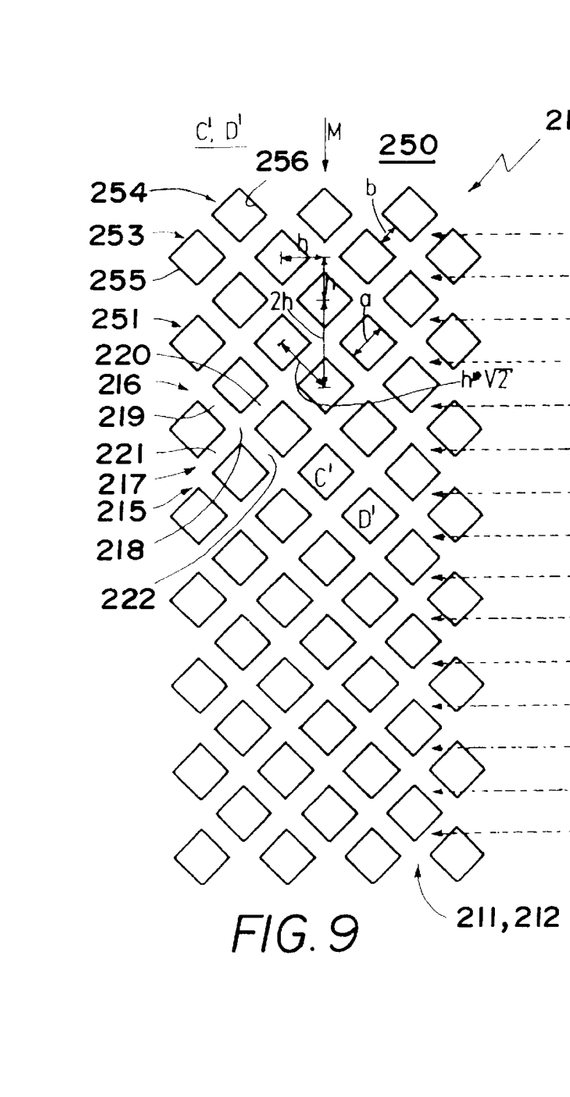
FIG. 9, which is a broken representation of a top view, corresponding to FIG. 3, but in schematic form, of the pole arrangements in accordance with the third exemplary embodiment of the present invention.
Figure 10:
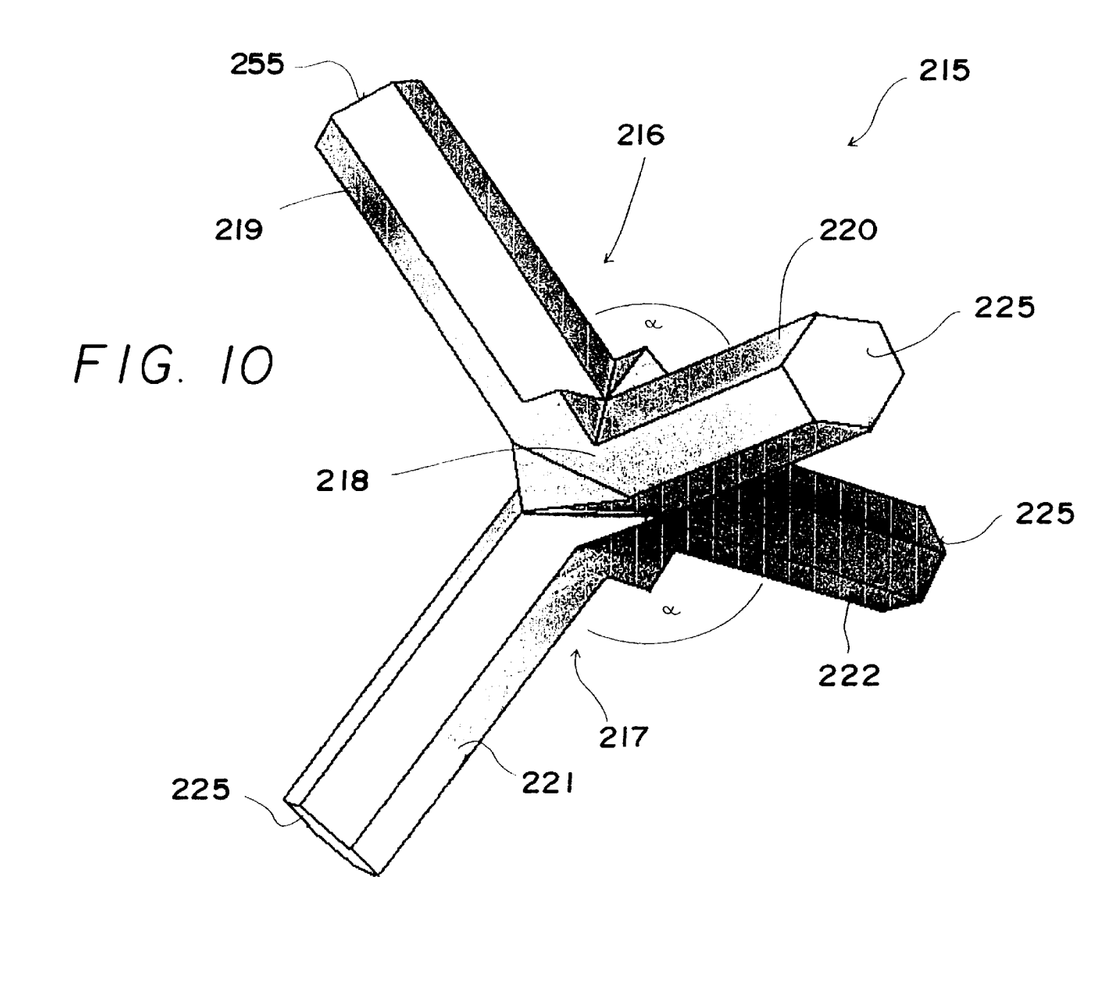
FIG. 10, which is a grid element of one of the pole elements in accordance with the third exemplary embodiment in an enlarged perspective representation.

With the third exemplary embodiment of a condenser 210 represented in FIGS. 8 to 12, the grid-like structure of the pole arrangements 211 and 212 is also formed by a uniform design and respective line-up of individual grid elements 215 constructed from strip-like element sections 219 to 222, whose V-shaped element section pairs 216 and 217, beginning at the junctions 218, because of a production process which is somewhat different from the exemplary embodiment of FIGS. 5 to 7, are uniform in cross section, the same as provided in the exemplary embodiment of FIGS. 1 to 4 and as can be seen from FIG. 10.

With this third exemplary embodiment, the condenser 210 is produced from a blank of any arbitrary spatial shape and size, the same as the condenser 110 of FIGS. 5 to 7. For the sake of simplicity, this is represented by means of a cube-shaped blank 245 in FIG. 8.

Figure 11:
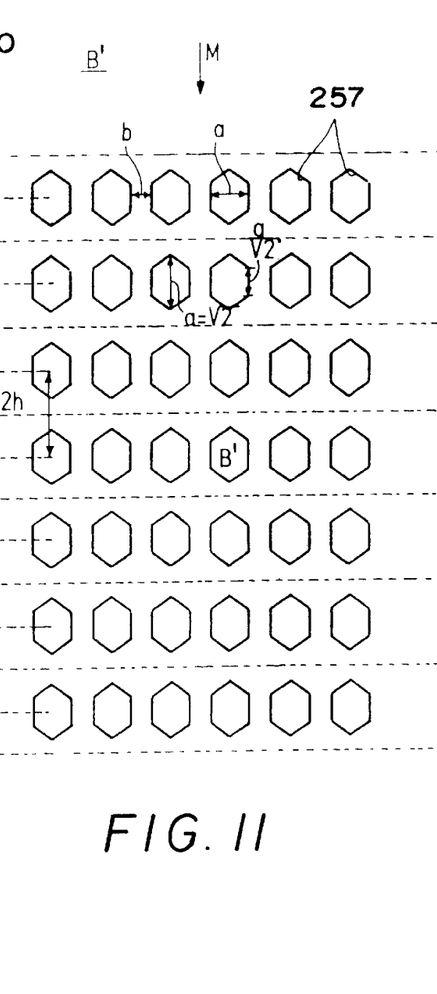
FIGS. 11 and 12, which are a lateral view, corresponding to FIG. 2, respectively in a broken representation, but schematically and from the direction of two sides extending perpendicularly with each other, of the pole arrangements for a condenser in accordance with the third exemplary embodiment.
Figure 12:
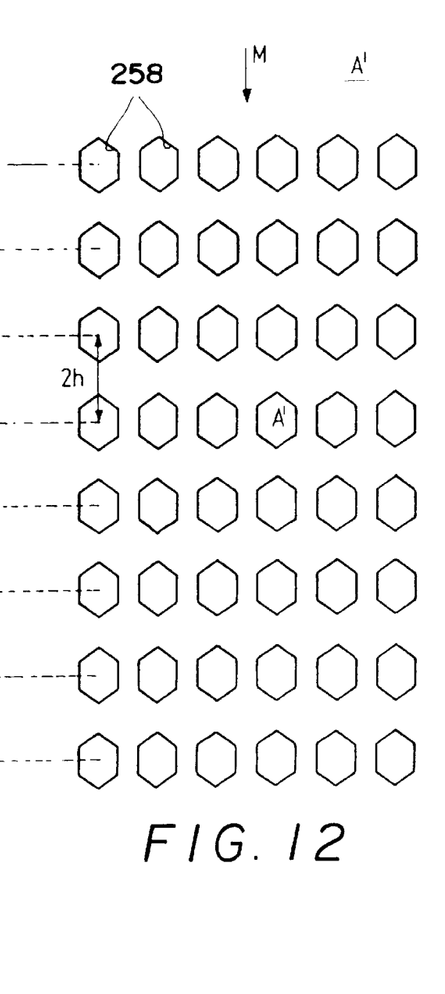

From the direction of two sides 250 and 251, which are vertical with respect to each other, the cube-shaped blank 245 is provided in accordance with the direction C' and D', or respectively C" and D", with respectively several rows 253 and 254 of continuous recesses 255 and 256, which here are square (see FIG. 9, which also represents a view from the direction C", D" on the face 251). In this case the adjoining recess rows 253 and 254 of each side 250 and 251 are provided with square recesses 255 and 256 in such a way that the recesses 255 and 256 of adjoining recess rows 253 and 254 are arranged offset with respect to each other. Furthermore, as in the second exemplary embodiment in accordance with FIGS. 5 to 7, recesses 257 and 258 are cut in several rows from two diagonal directions A' and B', which are vertical with respect to each other, i.e. at an angle of 45° to the side 250 and 251, on the one hand and, on the other, to the side 250 and a side opposite the side 251, wherein the rows of the one diagonal direction A' are also disposed offset with respect to those of the other diagonal direction B', as shown in FIGS. 11 and 12. These recesses 257 and 258 are embodied to be hexagonal. All of these recesses 255 to 258 have been cut into the blank 245 by means of a laser, for example.

Because of this arrangement of the recesses 255 to 258, the individual junctions 218 and the strips 219 to 222 extending from them result, as FIGS. 9, 11 and 12 show, which have a uniform hexagonal shape in cross section (FIG. 10), except for the areas immediately adjoining the junctions 218. With this third exemplary embodiment, too, the minimum number of planes, or respectively directions, from which the recesses 255 to 258 must be cut, is determined by the cross-sectional surface of the recesses. For example, if one side of the square recesses 255 and 256 is identified by a, and if the hexagonal bores 257 and 258 have a narrow side of the size a, the result at a half distance h between the recess centers of two recesses 255 adjoining each other via a junction 218 (FIG. 9) is the requirement that a>h/√2 must apply. The connecting lines between FIG. 9 and FIGS. 11 and 12 show, on the one hand, the offset arrangement of the recesses 255 to 258 and, on the other hand, the assignment of the centers of the recesses 255 to 258 to the centers of the strips 219 to 222. An advance of 2·h takes place in all spatial axes from one recess to the respectively adjoining one of the same direction A', B', C', D', or respectively D". Furthermore, the arrows M in FIGS. 9, 11 and 12 indicate the assumed center of the pole arrangements 211 and 212 of the condenser 210, which are nested in each other in all spatial directions.

In this exemplary embodiment, the separation of the pole arrangements 211 and 212 from each other is preferably provided in a way wherein the sides of the blank are provided in a continuation of the recesses 255 to 258 with corresponding halved recesses, which leads to a separation of the pole arrangements, which also becomes clear by means of FIG. 6 of the second exemplary embodiment, if there the lateral wall disk 160 were not cut off, but provided with half bores at corresponding locations. The provision of partitions in the blank in accordance with the third exemplary embodiment in FIGS. 8 to 12 can be made there in such a way that no recesses 255 to 258 at all are provided in a plane of the blank 254 intended for the partition. This is easily possible by means of laser cutting techniques. The separation of at least one of the pole arrangements 211, 212, which has to be made for this, is provided in this exemplary embodiment by cutting off defined strips of this pole arrangement.

Figure 13:
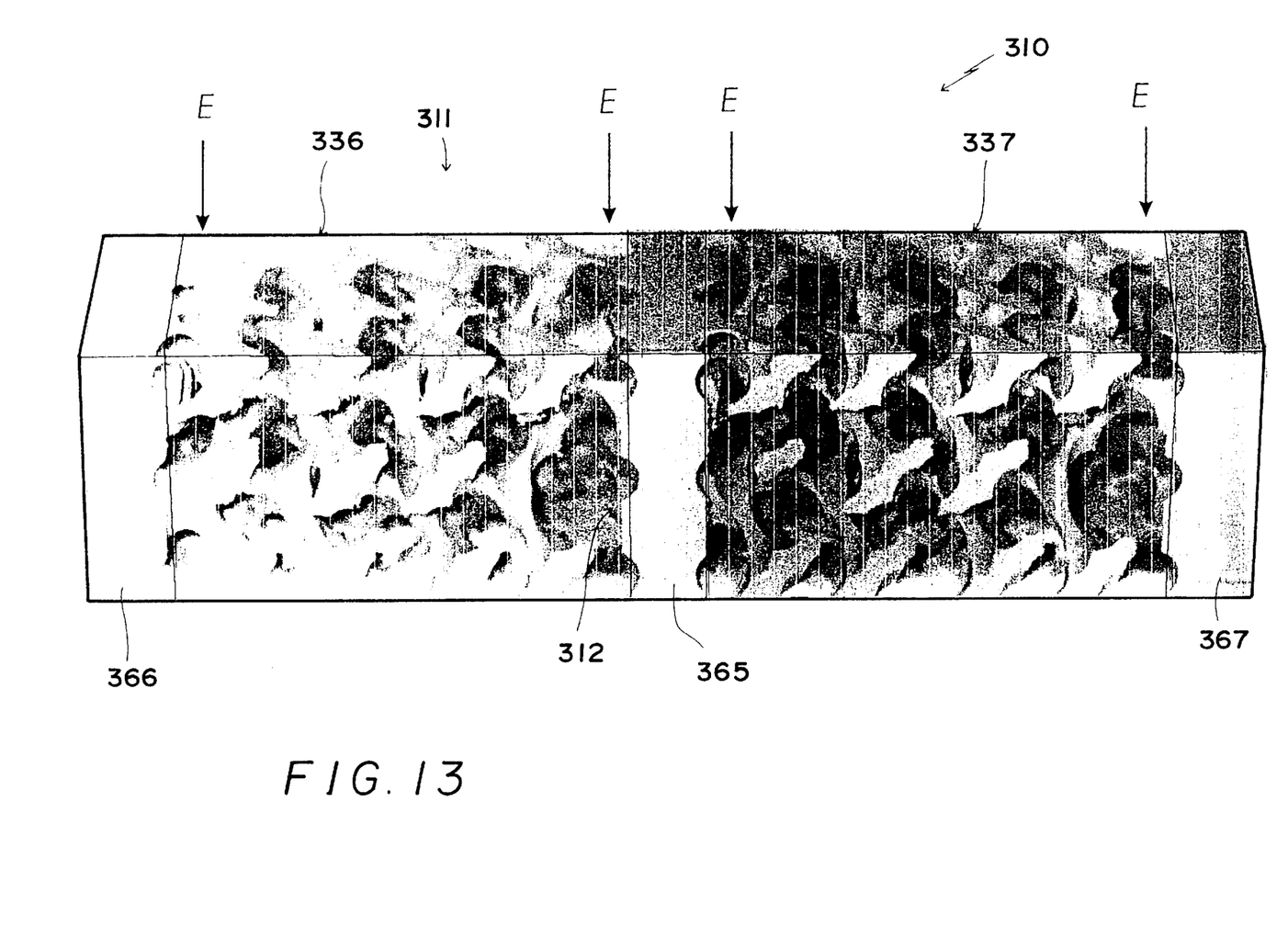
FIG. 13, which is a perspective representation of the pole arrangements, produced from an elongated cube-shaped blank, in accordance with the fourth exemplary embodiment of the present invention.

With this third exemplary embodiment, too, the same as with the fourth exemplary embodiment in accordance with FIGS. 13 and 14, still to be described, the basic material of the blank 245 can be of any arbitrary type, as has already been described by means of the second exemplary embodiment.

With the third exemplary embodiment of the present invention, the individual recesses can also be produced in such a way that the blank 245 in accordance with FIG. 8, after the recesses in the directions A', B', C', D' have been made, is clamped in an imagined diagonal line 246, drawn by a dotted line here, and is rotated around this diagonal line in three steps at an angular distance of respectively 120°. After each 120° rotation, the recesses in accordance with the directions A', B', C' and D' are cut. If this type of cutting the recesses is made in the form of cylindrical recesses in the form of bores, an evening out of the distances and surfaces of the strip-like element sections 219 to 222 between the junctions 218 takes place.

Figure 14A:
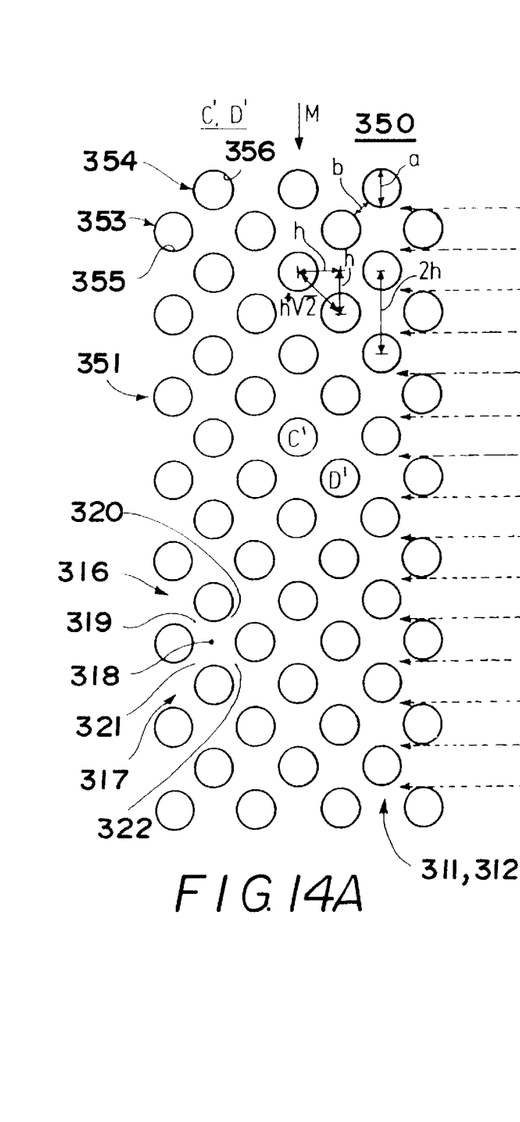
FIGS. 14A, B and C, which are broken representations of the fourth exemplary embodiment, corresponding to FIGS. 9, 11 and 12.
Figure 14B:
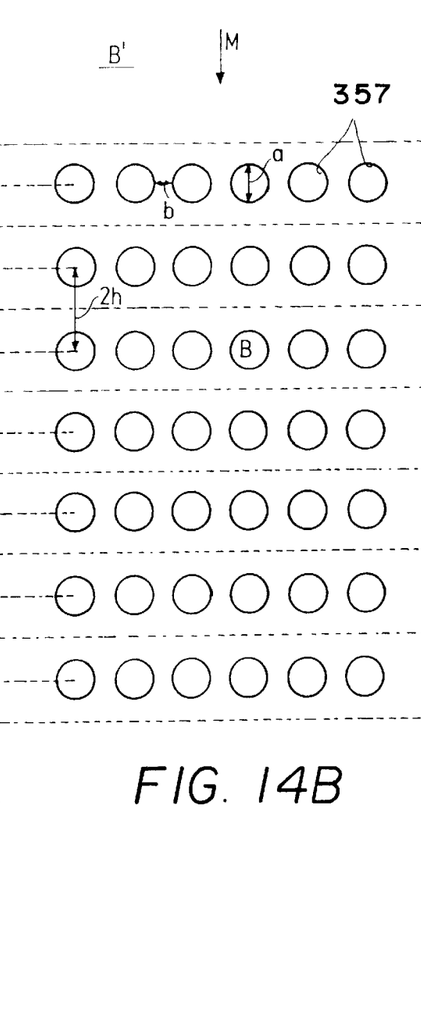
Figure 14C:
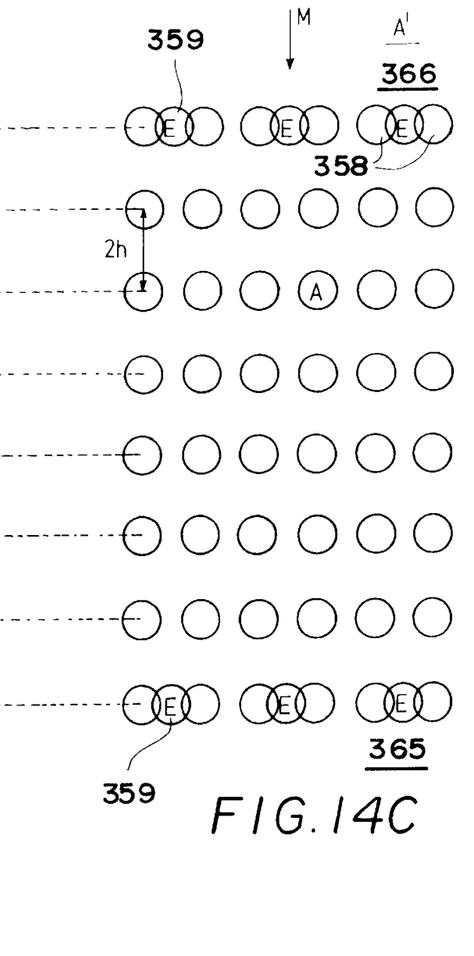

In the fourth exemplary embodiment of a condenser 310, represented in FIG. 13 and the partial FIGS. 14A to C, the grid-like structure of the pole arrangement 311 and 312 is embodied in accordance with the exemplary embodiment in FIGS. 5 to 7. In other words, in the fourth exemplary embodiment, the recesses 355 to 358 of the recess rows 353 and 354 are constituted by bores with a cylindrical diameter. The essential difference of this fourth exemplary embodiment 310 with respect to the second exemplary embodiment lies in the multi-cell construction of the condenser array 310.

Here, too, the basic body is an elongated cube, similar to the blank 254 in FIG. 8. The rows 353, 354 of the cylindrical recesses 355 to 358 in the directions A', B', C', D', or respectively D" represented there are cut according to the bore diagram represented there. These recess rows have been placed in such a way that end walls 366 and 367 and a cell separation wall 365 result, as can be seen in FIG. 13. The cell separation wall 365 results in that a relative dummy feed movement between the tool for producing the recess rows and the workpiece (blank) by at least 3 h takes place. This applies correspondingly to the production of the end walls 366 and 367 which, because of their flat outer surfaces, can be made thinner. Cylindrical separation recesses 359 and 359', which are respectively arranged between two adjoining bores 358 of adjoining bore pairs and intersect these bores 358, are cut from a direction E (FIG. 14c), which is parallel with the direction A' (FIG. 8) at both sides of the cell separation wall 365 and in the area of the inside of the end walls 366 and 367 for separating the pole arrangements 311 and 312 from each other and for opening up the one pole arrangement 311 into two individual poles 336 and 337. It can be clearly seen from FIG. 14C that the strips 319 to 322 remaining between adjoining bores 358 are cut, or respectively vanish when cutting the separation bores 359 and 359'.

In accordance with one variant, the separation bores 359' can be offset with respect to the separation bores 359 or they can be in the bore rows in FIG. 14B, depending on which one of the bore rows the separation bores are intended to be located. In accordance with FIG. 13, the individual poles 336 and 337, containing the end wall 366, or respectively 367, of the pole arrangement 311 result on the left and right, as well as the pole arrangement 312, which has the cell separation wall 365 in its central area and on whose two sides the strip-like structures are nested in all three spatial directions with the strip-like structure of the individual poles 336, or respectively that of the individual poles 337. Otherwise FIG. 14 can be directly compared in all further details and the arrangement of the recesses (bores) with FIGS. 9, 11 and 12, wherein FIG. 14 also simultaneously constitutes the view from the direction C", D" on the surface 351.

The second and fourth exemplary embodiments of a condenser 110, or respectively 310 with the cylindrical recesses, represented in the drawing figures, are preferred because of the uniform surfaces of the individual strips of the pole arrangements. Furthermore, if the cylindrical recesses are cut by means of a laser tool, it is possible to achieve a very small condenser form, down to a condenser integrated into an IC component.

Because of the manner of production, a flat tap for applying voltage results in particular with the second, third and fourth exemplary embodiments of the condensers 110, 210, or respectively 310.

The spatially three-dimensional, strip-like structure made of electrodes which are arranged nesting in each other in all spatial directions, wherein asymmetric grid structures are also possible, is fundamental in connection with the condenser 10, or respectively 110, or respectively 210, or respectively 310.

We claim:
1. An electrical condenser, including:
a negative pole arrangement;
a positive pole arrangement which is maintained at a defined distance from said negative pole arrangement; and
a dielectric provided between said pole arrangements,
wherein said pole arrangements each have a three-dimensional grid-like structure and are arranged nested inside each other in all spatial directions.

2. The condenser as defined in claim 1, wherein said pole arrangements have identical structures which are maintained essentially at the same distance.

3. The condenser as defined in claim 1, wherein each of said pole arrangements is formed by a plurality of three-dimensional grid elements having approximately V-shaped, strip-like element section pairs defining a junction, and which extend from said junction in two planes which extend vertically with respect to each other.

4. The condenser as defined in claim 3, wherein said strip-like element section pairs are connected next to each other and/or above each other at their respective ends, at least partially, with further strip-like element section pairs or grid elements.

5. The condenser as defined in claim 3, wherein said strip-like element section pairs comprise strips which have cross sections which are similar over their length or are dissimilar over their length.

6. The condenser as defined in claim 1, wherein said three-dimensional grid-like structure is three-dimensionally nested in sections.

7. The condenser as defined in claim 1, wherein said three-dimensional grid-like structure is formed in a blank by continuous recesses which are offset with respect to each other in at least two planes, and which extend vertically with respect to each other, and at least two planes rotated by 45° with respect to each other.

8. The condenser as defined in claim 7, wherein said recesses are constituted by bores.

9. The condenser as defined in claim 7, wherein said continuous recesses comprise square recesses viewed from two directions which extend vertically with respect to each other, and hexagonal recesses viewed from two directions which extend vertically with respect to each other, said continuous recesses so configured being cut by a laser.

10. The condenser as defined in claim 7, further including:
a wall disk,
wherein separation of said pole arrangements is provided by the at least partial separation of said wall disk on all sides of said blank.

11. The condenser as defined in claim 7, further including:
means for effecting separation of said pole arrangements, said means comprising one of: removal, such as by drilling, laser cutting of defined strips, and making separation recesses between said pole arrangements.

12. The condenser as defined in claim 1, wherein said grid-like structure is made of plastic with an appropriate coating.

13. The condenser as defined in claim 1, wherein said grid-like structure is made of metal.

14. The condenser array including two or more condensers as defined in claim 1, wherein at least one of said grid-like structures is cut through in one plane.

15. The condenser array as defined in claim 14, wherein the other of said grid-like structures is provided with a partition.

16. The condenser array as defined in claim 15, wherein said partition is formed such that no bores or recesses have been cut in a corresponding plane of said blank.

17. The condenser array as defined in claim 16, wherein said partition forms part of one electrode, and wherein another electrode adjoins said partition on both sides thereof and is separated therefrom by means of separation recesses.

18. The condenser array as defined in claim 14, wherein said grid-like structures are separated in planes which are disposed at a distance from each other.

19. A method for producing an electric condenser including: a negative pole arrangement; a positive pole arrangement maintained at a defined distance from the negative pole arrangement; and a dielectric provided between the poles, each pole arrangement having a three-dimensional grid-like structure arranged nested inside each other in all spatial directions, the method comprising the steps of:
cutting continuous recesses in a blank which are offset from each other, in at least two planes, which extend vertically with respect to each other, and which are offset by 45° to achieve a three-dimensional, grid-like structure; and
separating the total structure into at least two individual structures constituting the pole arrangements.

20. The method as defined in claim 19, further comprising the steps of:
rotating the blank around a diagonal, spatial axis in steps of 120°; and
providing said blanks with recesses.

21. The method as defined in claim 19, further comprising the step of:
cutting open in an intermediate plane at least one of the grid-like structures, whereby a partition extending over the entire cross-sectional surface of the pole arrangement is cut in this plane.

22. The method as defined in claim 21, further comprising the step of:
removal of appropriate strip-like element sections from at least one of the pole arrangements produces at least two pole sections,
wherein the partition is constituted in that no recesses are cut into a corresponding plane of the blank.

23. The method as defined in claim 22, wherein the strip-like element sections are removed by cutting separation recesses.

24. The method as defined in claim 22, wherein the recesses are drilled or laser cut.

* * * * *